UNITED STATES PATENT OFFICE.

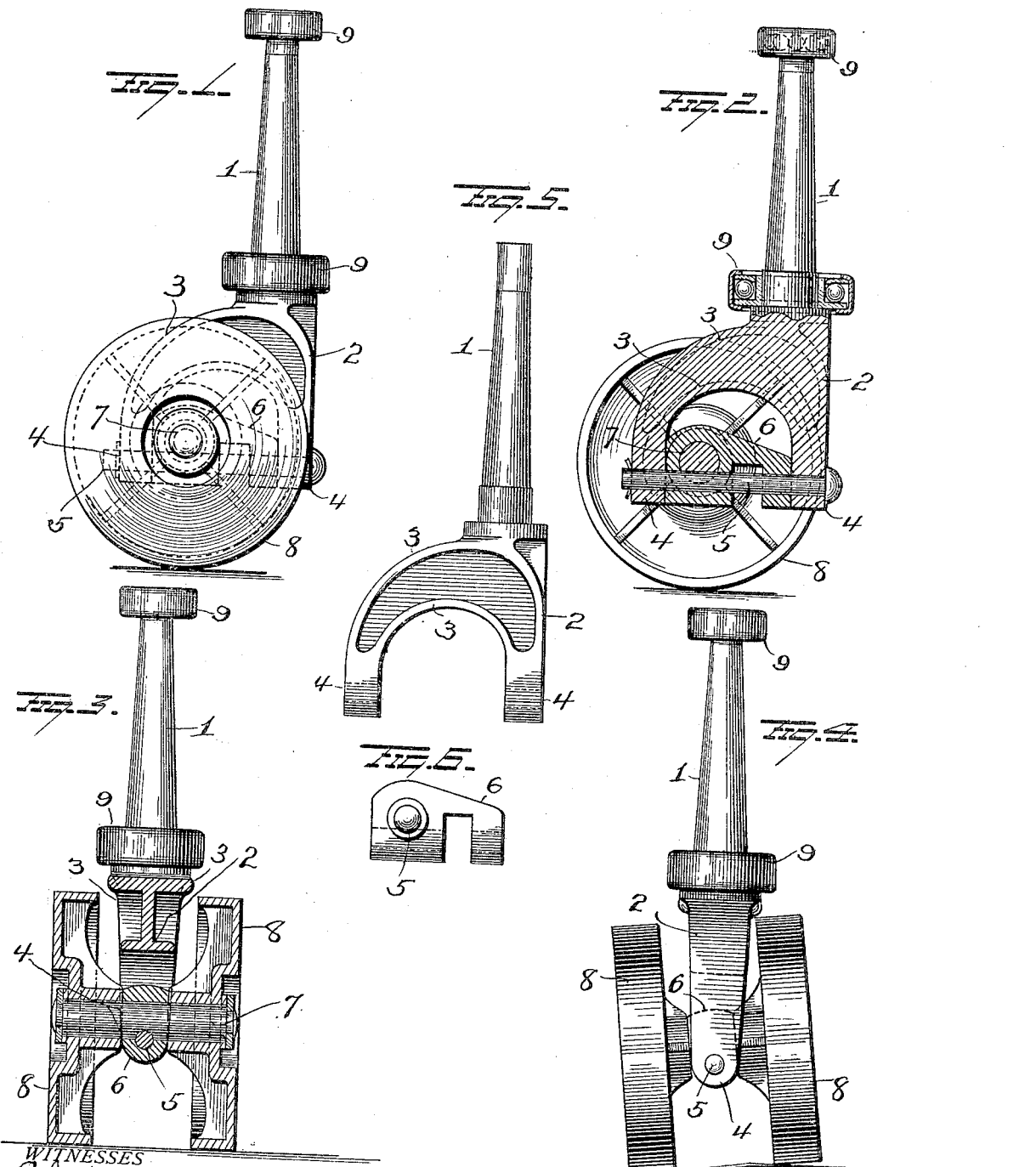

GEORGE E. SMOUSE, OF WASHINGTON, DISTRICT OF COLUMBIA.

CASTER.

1,106,853.  Specification of Letters Patent.  Patented Aug. 11, 1914.

Application filed November 11, 1913, Serial No. 800,374. Renewed July 3, 1914. Serial No. 848,944.

*To all whom it may concern:*

Be it known that I, GEORGE E. SMOUSE, of Washington, District of Columbia, have invented certain new and useful Improvements in Casters; and I do hereby declare the following to be a full, clear, and exact description of the invention, such as will enable others skilled in the art to which it appertains to make and use the same.

My invention relates to an improvement in casters designed particularly for use on transfer trucks for type forms, but which may be used on store and other trucks and also on safes and furniture.

One object is to provide a caster that may pass over obstruction without imparting any appreciable lift or tilt to the platform of the truck or other article which it supports.

A further object is to provide a caster of the double wheel type that will be of few parts, exceedingly simple and strong in construction and comparatively inexpensive to manufacture.

With these objects in view my invention consists in the parts and combination of parts as will be more fully described and pointed out in the claims.

In the accompanying drawings, Figure 1 is a view in side elevation of my improved caster; Fig. 2 is a vertical sectional view; Fig. 3 is a view in vertical section at right angles to Fig. 2; Fig. 4 is a view in end elevation showing the wheels tilted; Fig. 5 is a view of the yoke, and Fig. 6 is a view in elevation of the bearing block.

1 represents the caster spindle terminating at its lower end in the yoke 2, the spindle being located approximately in the vertical plane of one end of the yoke. This yoke which is fixed to the spindle and is preferably integral with the same, is preferably provided with marginal flanges 3 for increasing its strength without materially adding to its weight, and is also provided at its free ends with bearings 4 for the passage of the pin 5. This pin may be keyed to the yoke, or it may be mounted to turn in the same, and it carries and supports the bearing block 6, which may be mounted to turn on the pin 5, or it may be keyed to the pin, as it is when the pin engages the axle as shown in the drawings. This bearing block 6 is approximately as long as the space between the free ends of the yoke, and is somewhat enlarged adjacent its rear end for the passage of the axle 7, on which the caster wheels 8 are mounted. This axle may be integral with the block 6, but I prefer to make it separate therefrom and pass it through the block, as shown. With this construction the opening through the block for the pin 5, cuts into the bottom of the opening for the axle and slightly into the axle as shown in Figs. 2 and 3, so that when the axle is made separate from the block, it will be locked in place by the pin 5.

The axis of the wheel axles 7, is in a plane above the axis of the pin 5, thus bringing the load supporting point below the axis of the wheels, so that if either wheel of the pair passes over an obstruction, there will be comparatively little vertical lift and inappreciable side movement to the spindle 1. This makes it specially applicable for use on transfer trucks for type forms as it reduces to a minimum the danger of disturbing the latter. The wheel axle 7 is also located to the rear of the vertical plane of the spindle 1, so as to hold the wheels 8 in a position where they will properly trail when the truck is moved. The spindle 1 is provided at its free end, and also at a point just above its juncture with the yoke, with the anti-friction bearings 9, of any approved form which will permit the spindle to turn readily in the leg of the table, truck or other device to which it may be applied.

These casters may be made of all sizes and shapes and for any and all purposes where a two wheel caster is ordinarily used.

It is evident that many slight changes might be resorted to in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters-Patent, is:—

1. A caster consisting of a yoke, a spindle located adjacent one end of the latter, a bearing block mounted to turn in the yoke and wheel supporting means carried by the block in a plane above the axis of the latter.

2. A caster consisting of a yoke, a spindle rigid with the yoke and located adjacent one end of the latter, a bearing block mounted to turn in the yoke, and wheel supporting means carried by the block in a plane above the axis of the latter.

3. A caster consisting of a yoke, a spindle rigid with the yoke, a block located intermediate the ends of the yoke, an axle carried by the block, caster wheels on said axle and a pin passing through the ends of the yoke and block and through a notch in the axle for locking the latter to the block.

In testimony whereof, I have signed this specification in the presence of two subscribing witnesses.

GEORGE E. SMOUSE.

Witnesses:
A. W. BRIGHT,
S. C. HILL.